US008756516B2

(12) United States Patent
Singh et al.

(10) Patent No.: US 8,756,516 B2
(45) Date of Patent: Jun. 17, 2014

(54) METHODS, SYSTEMS, AND COMPUTER PROGRAM PRODUCTS FOR INTERACTING SIMULTANEOUSLY WITH MULTIPLE APPLICATION PROGRAMS

(75) Inventors: Mona Singh, Cary, NC (US); Ryan C. Fry, Portsmouth, NH (US)

(73) Assignee: Scenera Technologies, LLC, Portsmouth, NH (US)

( * ) Notice: Subject to any disclaimer, the term of this patent is extended or adjusted under 35 U.S.C. 154(b) by 1055 days.

(21) Appl. No.: 11/590,018

(22) Filed: Oct. 31, 2006

(65) Prior Publication Data
US 2008/0148149 A1    Jun. 19, 2008

(51) Int. Cl.
*G06F 3/048*    (2013.01)
(52) U.S. Cl.
USPC ........... 715/764; 715/863; 715/768; 715/804; 715/224
(58) Field of Classification Search
CPC ............ G06F 3/048; G06F 3/00; G06F 3/033
USPC .......................... 715/224, 759, 863, 768, 804
See application file for complete search history.

(56) References Cited

U.S. PATENT DOCUMENTS

| | | | |
|---|---|---|---|
| 4,783,648 A | | 11/1988 | Homma et al. |
| 4,789,962 A | | 12/1988 | Berry et al. |
| 5,075,673 A | | 12/1991 | Yanker |
| 5,252,951 A | * | 10/1993 | Tannenbaum et al. ........ 345/156 |
| 5,374,942 A | | 12/1994 | Gilligan et al. |
| 5,528,260 A | | 6/1996 | Kent |
| 5,712,995 A | | 1/1998 | Cohn |
| 5,721,829 A | | 2/1998 | Dunn et al. |
| 5,742,778 A | * | 4/1998 | Hao et al. ....................... 715/759 |
| 5,748,974 A | * | 5/1998 | Johnson ............................ 704/9 |
| 5,781,192 A | * | 7/1998 | Kodimer ....................... 715/770 |
| 5,802,388 A | * | 9/1998 | Zetts et al. ..................... 715/224 |
| 5,805,167 A | | 9/1998 | Van Cruyningen |
| 5,838,318 A | | 11/1998 | Porter et al. |
| 5,912,668 A | | 6/1999 | Sciammarella et al. |
| 5,999,689 A | | 12/1999 | Iggulden |

(Continued)

FOREIGN PATENT DOCUMENTS

WO       WO9631819       10/1996

OTHER PUBLICATIONS

"Active Window Tracking," Registry Guide for Windows, <URL: http://winguides.com/registry/display.php/18/> pp. 1-2 (Copyright 2005).

(Continued)

*Primary Examiner* — Michael Roswell

(57) ABSTRACT

Methods, systems, and computer program products for interacting simultaneously with multiple application programs are disclosed. According to one aspect, a method includes allowing a first application program to be associated with a second application program. The first and second application programs are responsive to inputs received via a user interface for interacting with respective user interface components associated with the first and second application programs. Further, an input is received via the user interface when the first application program has focus within the user interface. The received input is neither for interacting with the user interface components associated with the first application program nor the second application program. The association between the first and second application programs is used to present a portion of information related to the second application program while maintaining the focus of the first application program within the user interface in response to receiving the input.

35 Claims, 5 Drawing Sheets

(56) References Cited

U.S. PATENT DOCUMENTS

| | | | |
|---|---|---|---|
| 6,008,809 A | 12/1999 | Brooks | |
| 6,056,458 A | 5/2000 | Lin | |
| 6,072,486 A * | 6/2000 | Sheldon et al. | 715/835 |
| 6,088,481 A | 7/2000 | Okamoto et al. | |
| 6,211,879 B1 | 4/2001 | Soohoo | |
| 6,337,694 B1 | 1/2002 | Becker et al. | |
| 6,363,204 B1 | 3/2002 | Johnson et al. | |
| 6,401,138 B1 | 6/2002 | Judge et al. | |
| 6,404,977 B1 | 6/2002 | Iggulden | |
| 6,597,857 B1 | 7/2003 | Clapper | |
| 6,690,387 B2 | 2/2004 | Zimmerman et al. | |
| 6,807,668 B2 | 10/2004 | Stern et al. | |
| 6,938,221 B2 * | 8/2005 | Nguyen | 715/863 |
| 6,944,819 B2 | 9/2005 | Banatwala et al. | |
| 6,971,067 B1 | 11/2005 | Karson et al. | |
| 7,017,173 B1 | 3/2006 | Armstrong et al. | |
| 7,146,573 B2 | 12/2006 | Brown et al. | |
| 7,346,848 B1 * | 3/2008 | Ruthfield et al. | 715/749 |
| 7,429,993 B2 * | 9/2008 | Hui | 345/629 |
| 7,461,352 B2 * | 12/2008 | Katsuranis | 715/800 |
| 7,489,307 B2 * | 2/2009 | Tanaka et al. | 345/173 |
| 2002/0092021 A1 | 7/2002 | Yap et al. | |
| 2002/0104096 A1 | 8/2002 | Cramer et al. | |
| 2002/0140665 A1 | 10/2002 | Gordon | |
| 2003/0117440 A1 * | 6/2003 | Hellyar et al. | 345/767 |
| 2003/0214540 A1 | 11/2003 | Huapaya et al. | |
| 2003/0227492 A1 | 12/2003 | Wilde et al. | |
| 2004/0215689 A1 | 10/2004 | Dooley et al. | |
| 2005/0245240 A1 | 11/2005 | Balasuriya et al. | |
| 2006/0048073 A1 | 3/2006 | Jarrett et al. | |
| 2006/0121886 A1 | 6/2006 | Maehara et al. | |
| 2006/0212197 A1 | 9/2006 | Butler et al. | |
| 2006/0268020 A1 | 11/2006 | Han | |
| 2007/0209017 A1 | 9/2007 | Gupta et al. | |

OTHER PUBLICATIONS

"Actual Title Buttons," Actual Tools, <URL: http://www.actualtools.com/titlebuttons/> pp. 1-6 (Sep. 23, 2005).

"Actual Transparent Window," Actual Tools <URL: http://www.actualtools.com/transparentwindow/> pp. 1-4 (Sep. 23, 2005).

"Actual Window Guard," Actual Tools <URL: http://www.actualtools.com/windowguard/> pp. 1-5 (Sep. 23, 2005).

"Actual Window Manager," Actual Tools <URL: http://www.actualtools.com/windowmanager/> pp. 1-6 (Sep. 23, 2005).

"Actual Window Menu," Actual Tools <URL: http://www.actualtools.com/windowmenu/> pp. 1-5 (Sep. 23, 2005).

"Actual Window Minimizer," Actual Tools <URL: http://www.actualtools.com/windowminimizer/> pp. 1-5 (Sep. 23, 2005).

"Actual Window Rollup," Actual Tools <URL: http://www.actualtools.com/windowrollup/> pp. 1-3 (Sep. 23, 2005).

"Auto Window Manager 1.2," Eusing Software <URL: http://eusing.com/WindowManager/WindowManager.htm> pp. 1-2 (Copyright 2004-2005).

"BKResizer v1.1.3," http://users.tpg.com/au/hbk02542/products/bkresizer/about.htm> pp. 1-4 (Copyright 2003-2005).

Badros, et al., "Cassowary—A Constraint Solving Toolkit," <URL: http://www.cs.washington.edu/research/constraints/cassowary/> pp. 1-3 (Feb. 12, 2003).

"Change the Application Focus Settings," Registry Guide for Windows, <URL: http://winguides.com/registry/display.php/540/> pp. 1-2 (Copyright 2005).

"Constraints Screenshots," <URL: http://www.scwm.sourceforge.net/constraints_schreenshot.gif> [online] Retrieved Dec. 23, 2005 (publication date unknown).

"Elastic Windows for Rapid Multiple Window Management," Human-Computer Interaction Lab/University of Maryland <URL: http://www.cs.umd.edu/hcil/elastic-windows/> pp. 1-2 [online] Retrieved on Dec. 23, 2005 (publication date unknown).

"MortPlayer," [online] sto-helit.de, publication date unknown [retrieved Oct. 3, 2006] Retrieved from the Internet: <URL: http://www.sto-helit.de/modules/edito/content/php?id=28.

Badros, et al., "Scheme Constraints Window Manager," SCWM <URL: http://scwm.sourceforge.net/#introduction> pp. 1-8 [online] Retrieved from the Internet Dec. 23, 2005 (publication date unknown).

Badros, et al., "SCWM: An Intelligent Constraint-Enabled Window Manager," American Association for Artificial Intelligence, pp. 1-8 (Copyright 2000).

Quicquaro, "TVPhone," [online] Michael Quicquaro, Publication Date Unknown [retrieved on Oct. 3, 2006] Retrieved from the Internet: <URL: http://www.tvphone.com/tvphone.txt> 2 pages.

"WFMU Mobile Phone FAQ," [online] Copyright 2006 WFMU [retrieved on Oct. 3, 2006] Retrieved from the Internet: <URL: http://www.wfmu.org/mobile_faq.htm> 2 pages.

"WinArranger Free 1.11," ManageBytes Software <URL: http://softplatz.com/Soft/Desktop/Desktop-management/WinArranger-Free.html> pp. 1-2 (Copyright 2005).

"WinTiles Plus," SOHO Evolution, LLC <URL: http://www.1000files.com> pp. 1-2 (Copyright 2002-2005).

"ZMover: Desktop Layout Manager," <URL://www.net-sharing.com> pp. 1-2 (Copyright 2000-2005).

* cited by examiner

METHODS, SYSTEMS, AND COMPUTER PROGRAM PRODUCTS FOR INTERACTING SIMULTANEOUSLY WITH MULTIPLE APPLICATION PROGRAMS

TECHNICAL FIELD

The subject matter described herein relates to application program interaction. More particularly, the subject matter described herein relates to methods, systems, and computer program products for interacting simultaneously with multiple application programs.

BACKGROUND

Many electronic devices provide a user interface by which a user may interact with multiple application programs. In particular, a user may use an input device of the user interface for entering input to interact with user interface components of the application programs. The application programs may be responsive to the input. Exemplary electronic devices on which application programs may execute include mobile phones, cameras, personal digital assistants (PDAs), network components, televisions, and computers.

One example of a user interface component of an application program with which a user may interact is a display window. One or more windows associated with application programs may be displayed on a display of an electronic device. A window may include graphics and/or text for presentation to a user by a respective application program. A user may interact with a window via a keyboard, a mouse, or any other suitable input device. User interaction with a window may include entering text into a window or selecting portions of the window. Data associated with the user interaction may be provided to the respective application program.

When a window is displayed, an application program associated with the window may have "focus" with a user interface. An application program having focus means that the corresponding window is active to receive input via a user interface. Typically, a window having focus may be indicated by a different color than other windows. The other windows do not receive input via the user interface unless activated. In one example, a window may be activated by selection via a mouse. In mobile phone applications, different windows may be selected by using a keypad or a scroll button.

One difficulty with window interaction is that a context of interaction with a window may be lost when user interaction switches between windows. For example, a user reading an e-mail message in a window associated with an e-mail application program may switch to a window associated with a calendar application program. When the user switches back to the e-mail message window, the same message may appear; however, a context of interaction with the window may be lost. For example, a scroll context, a selection context, or a highlight context may be lost. When the context is lost, a user must interact with the window via a user interface to regain the context.

When a user switches from a window with focus to another window, the user may switch to obtain information associated with the application program associated with the other window. For example, a user may switch from an e-mail window having focus to a calendar window in order to obtain appointment information in the associated calendar application program. As a result of switching to the calendar window, the calendar application program is selected and the context of the e-mail window may be lost. It would be beneficial to be able to obtain desired information from the calendar application program or any other application program while maintaining focus of the e-mail application program with the user interface.

In another example, a networked television may provide for interaction via a user interface for controlling and viewing the status of other appliances. Typically, a television is used for viewing video content. It would be beneficial to provide for a user to enter input via a user interface for controlling and/or viewing output from another appliance without losing the context in the video viewing window.

Accordingly, in light of the above described difficulties and needs, there exists a need for improved methods, systems, and computer program products for interacting simultaneously with multiple application programs.

SUMMARY

According to one aspect, the subject matter described herein includes methods, systems, and computer program products for interacting simultaneously with multiple application programs. One method includes allowing a first application program to be associated with a second application program. The first and second application programs are responsive to inputs received via a user interface for interacting with respective user interface components associated with the first and second application programs. Further, an input is received via the user interface when the first application program has focus within the user interface. The received input is neither for interacting with the user interface components associated with the first application program nor the second application program. The association between the first and second application programs is used to present a portion of information related to the second application program while maintaining the focus of the first application program within the user interface in response to receiving the input.

As used herein, the term "application program" refers to a set of data or instructions that may be utilized by a computing system. An application program may include one or more user interface components for presenting information or data to a user or for receiving information or data to a user.

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
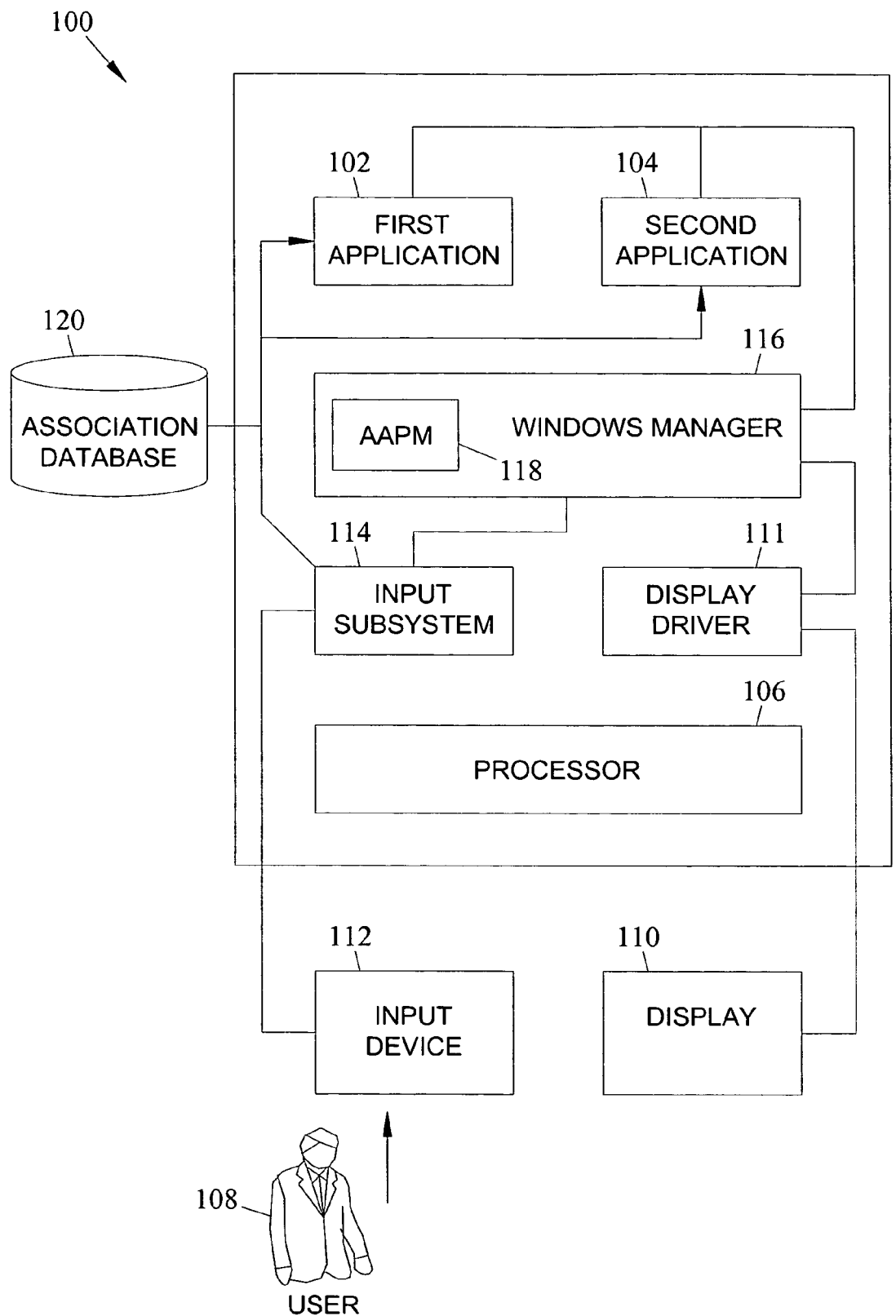
FIG. 1 is a block diagram of an exemplary system for interacting simultaneously with multiple application programs according to an embodiment of the subject matter described herein.

The subject matter described herein includes methods, systems, and computer program products for interacting simultaneously with multiple application programs. According to one aspect, a system according to the subject matter described herein may be implemented as hardware, software, and/or firmware components executing on one or more components of a system configured to allow a user to interact with application programs. FIG. 1 is a block diagram of an exemplary system 100 for interacting simultaneously with multiple application programs according to an embodiment of the subject matter described herein. Referring to FIG. 1, system 100 may be configured to store and manage first and second application programs 102 and 104, respectively, although more than two application programs may be stored and managed by system 100. A processor 106 may run application programs 102 and 104 either simultaneously or separately. Application programs 102 and 104 may each include a user interface component for allowing a user 108 to interact with a respective application program. A user interface component may be a window, icon, or other suitable image suitable for display on a display 110. A display driver 111 may manage display 110. System 100 may be implemented on any suitable electronic device such as a mobile phone, a PDA, a network component, a television, a computer, and a device configured to implement a web portal.

User 108 may use an input device 112 for interacting with a user interface component of an application program displayed on display 110. For example, input device 112 may receive input from user 108. In this example, the received input may be passed by input device 112 to an input subsystem 114. Examples of input devices include a mouse, a keyboard, a microphone, and a camera. Input subsystem 114 may digitize received input signals and manage input data. Exemplary inputs include mouse clicks from a mouse, mouse gestures from a mouse, keystrokes (or buttons) from a keyboard (or remote control), speech input from a microphone, and gaze input from a user captured by a camera. Examples of mouse gestures include movement of a mouse or a time period in which a cursor controlled by a mouse is held over a predetermined portion of a display. Input subsystem 114 may communicate the input data to a windows manager 116. Windows manager 116 is configured to manage the display of windows on display 110.

Application programs 102 and 104 may be responsive to inputs from a user interface for interacting with respective user interface components associated with application programs 102 and 104. For example, application programs 102 and 104 may be responsive to inputs from input device 112. An input from input device 112 may control a user interface component associated with one of application programs 102 and 104. For example, the input may control a window associated with one of application programs 102 and 104. Example inputs to application programs include a mouse gesture, a speech input, a keystroke, and gaze input. Input subsystem 114 may receive an input to an application program and route the input to one of application programs 102 and 104 or to another destination. Example application programs include a calendar application program, an e-mail application program, an appliance application program, a web browser application program, and a word processing application program.

System 100 may include means for allowing a first application program to be associated with a second application program. For example, windows manager 116 may include an associated application program manager (AAPM) 118 configured to allow first application program 102 to be associated with second application program 104. Data for use in associating application programs may be stored at an association database 120. The stored data may be predetermined records of the association between application programs. In one example, a record may define an input received via a user interface when first application program 102 has focus within the user interface. In this example, the defined input is neither for interacting with user interface components associated with first application program 102 nor second application program 104. Further, for example, the record may define an action to be performed in response to receiving the defined input. The action may include presenting a portion of information related to second application program 104 while maintaining the focus of first application program 102 with input device 102.

System 100 may include means for receiving an input via a user interface when the first application program has focus within the user interface. For example, input device 112 may receive an input when first application program 102 has focus within input device 112. The received input may be neither for interacting with the user interface components associated with first application program 102 nor second application program 104. For example, inputs may be defined for interacting with user interface components associated with first application program 102 and second application program 104. In this example, windows manager 116 may determine whether a received input is defined for interacting with either one of first application program 102 and second application program 104. If the input is not defined for either application program, it may be determined that the input is neither for interacting with the user interface components associated with first application program 102 nor second application program 104.

System 100 may include means for using the association between first and second application programs in response to receiving input to present a portion of information related to the second application program while maintaining the focus of the first application program within the user interface. For example, AAPM 118 may use a record of application database 120 in response to receiving input from input device 112 to present a portion of information related to second application program 104 while maintaining focus of first application program 102 within input device 112. AAPM 118 may retrieve the information from second application program 104 and control display 110 to display the retrieved information. For example, AAPM 118 may retrieve information from a calendar application program for presentation via display 110.

Figure 2:
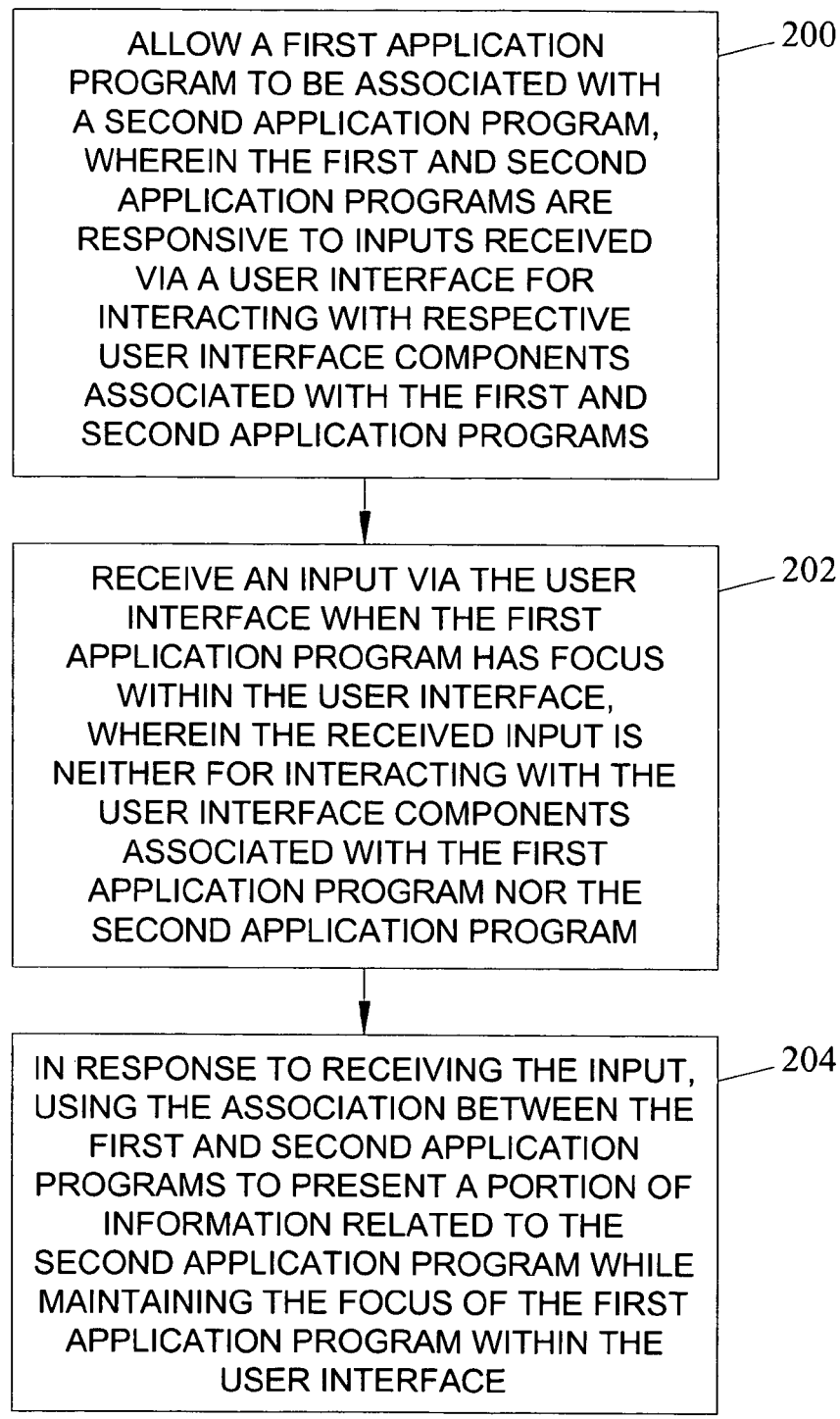
FIG. 2 is a flow chart of an exemplary process for interacting simultaneously with multiple application programs according to an embodiment of the subject matter described herein.

FIG. 2 is a flow chart illustrating an exemplary process for interacting simultaneously with multiple application programs according to an embodiment of the subject matter described herein. Referring to FIG. 2, in block 200 the process provides for allowing a first application program to be associated with a second application program. For example, first application program 102 may be associated with second application program 104. First and second application programs 102 and 104 may be responsive to inputs received via input device 112 for interacting with respective user interface components associated with first and second application programs 102 and 104. For example, first and second application programs 102 and 104 may control the display of respective windows presented on display 110. In this example, first and second application programs 102 and 104 may be responsive to inputs for interacting with the respective windows presented on display 110.

In block 202, an input may be received via the user interface when the first application program has focus within the user interface. For example, an input may be received via input device 112 when first application program 102 has focus with input device 112. In this example, first application program 102 may have focus with input device 112 when a cursor controlled by input device 112 is within a window associated with first application program 102 is presented on display 110. Further, in block 202, the received input is neither for interacting with the user interface components associated with the first application program nor the second application program. For example, AAPM 118 may route the received input to application programs 102 and 104. Application programs 102 may indicate whether the received input is recognized for interacting with a respective user component. In this example, based on the indication, AAPM 118 may determine that the received input is not for interacting with applications programs 102 and 104.

In block 204, in response to receiving the input, the association between the first and second application programs may be used to present a portion of information related to the second application program while maintaining the focus of the first application program within the user interface. For example, in response to receiving an input from input device 112, an association between first and second application programs 102 and 104 may be used to present a portion of information related to second application program while maintaining the focus of first application program 102 with input device 112. In this example, input received from input device 112 may be defined in a record of association database 120. In this example, the record may also define first application program 102 as having focus and being associated with second application program 104. The record may also indicate content information related to second application program 104 for display when the input defined in the record is received and when first application program 102 has focus within input device 112. In one example, the information related to second application program 104 may be presented in a window on display 110.

Figure 3A:
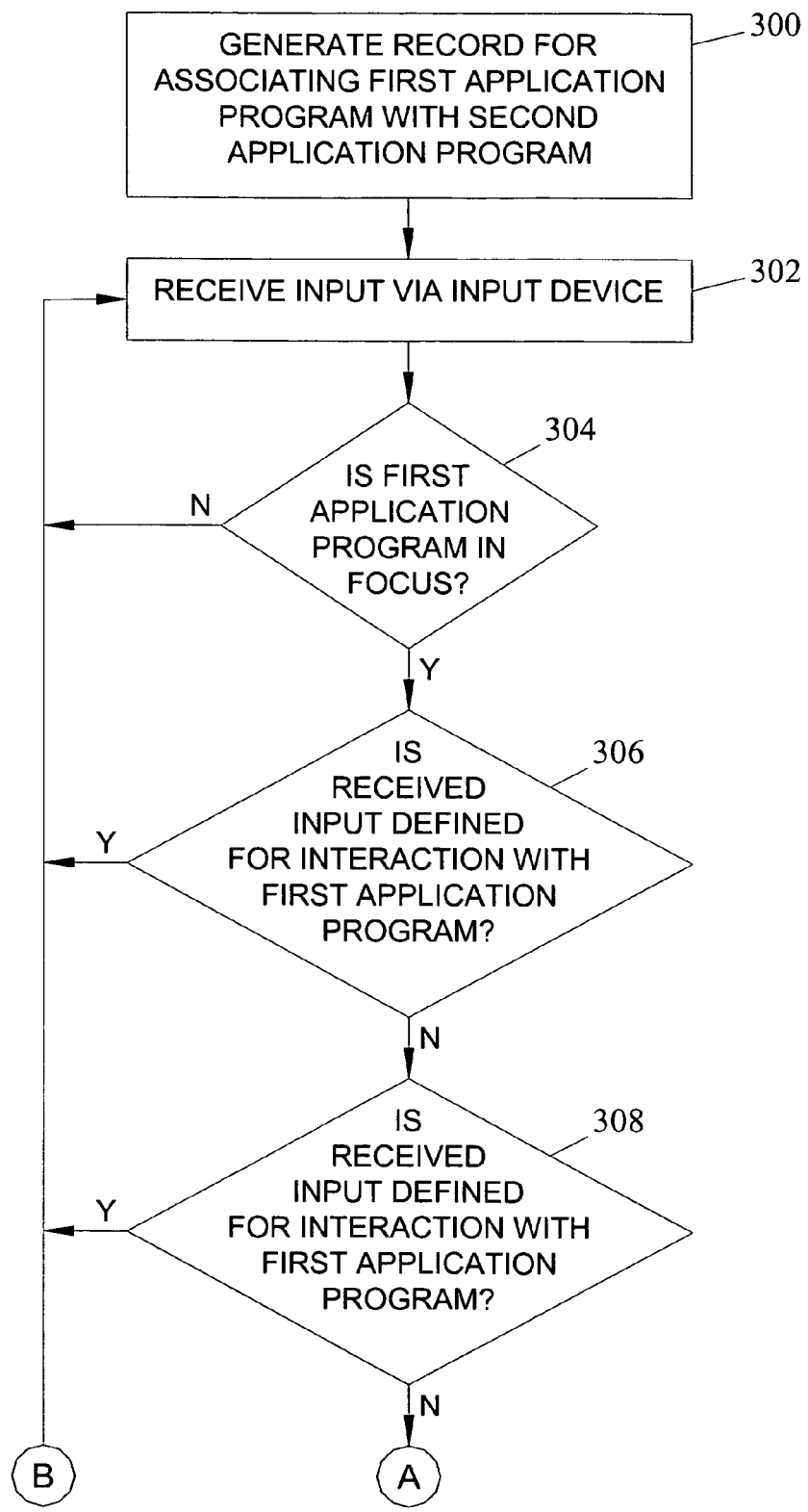
FIGS. 3A and 3B is a flow chart of an exemplary process for use by the system shown in FIG. 1 for interacting simultaneously with multiple application programs according to an embodiment of the subject matter described herein.
Figure 3B:
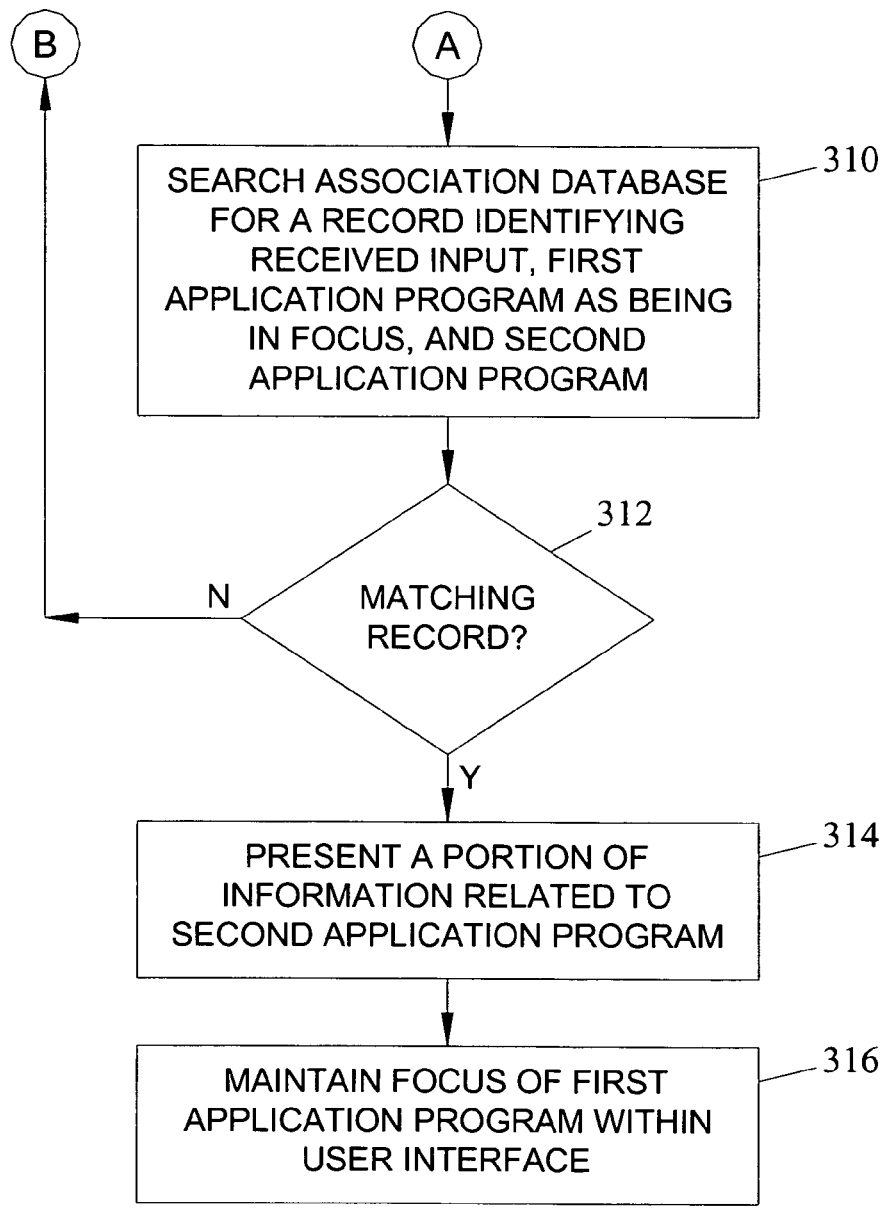

FIGS. 3A and 3B is a flow chart illustrating an exemplary process for use by system 100 shown in FIG. 1 for interacting simultaneously with multiple application programs according to an embodiment of the subject matter described herein. Referring to FIG. 3A, in block 300 a record is generated for associating first application program 102 with second application program 104. For example, Table 1 below shows exemplary records for associating application programs.

TABLE 1

Exemplary Records for Associating Application Programs

| Application Program with Focus (First Application Program) | User Input | Associated Second Application Program | Content Information Related to Second Application Program | Presentation Characteristics |
|---|---|---|---|---|
| E-mail | Circular Mouse Gesture | Calendar | Next Two Appointments | Overlay Window on Second Application Program and Make the |

TABLE 1-continued

Exemplary Records for Associating Application Programs

| Application Program with Focus (First Application Program) | User Input | Associated Second Application Program | Content Information Related to Second Application Program | Presentation Characteristics |
|---|---|---|---|---|
| E-mail | Two Circular Mouse Gestures | Calendar | Appointments of Entire Day | Window Translucent Overlay Window on Second Application Program and Display for 30 Seconds |
| E-mail | Speech Input "Meeting" | Calendar | Next Scheduled Meeting Information | Overlay On First Application Program |

The exemplary records shown in Table 1 are records that may be stored in association database 120 for access by AAPM 118. In each of the exemplary records, the application program (first application program) with focus is an e-mail application program. The associated second application program is a calendar application program. In the first exemplary record, when the e-mail application program has focus and a circular gesture is made with a mouse for neither interacting with user interface components of the e-mail application program nor the calendar application program, the next two appointments in the calendar application program are presented while maintaining focus of the e-mail application program. The next two appointments are displayed in a translucent window on display 110. In the second exemplary record, when the e-mail application program has focus and two circular gestures are made with the mouse for neither interacting with user interface components of the e-mail application program nor the calendar application program, the appointments of the entire day in the calendar application program are presented while maintaining focus of the e-mail application program. The appointments for the entire day are displayed in a window on display 110 over a window of the calendar application program for 30 seconds. In the third exemplary record, when the e-mail application program has focus and the word "meeting" is spoken into a microphone for neither interacting with user interface components of the e-mail application program nor the calendar application program, information about the next scheduled meeting in the calendar application program is presented while maintaining focus of the e-mail application program. The information about the next scheduled meeting is displayed in a window on display 110 over a window of the e-mail application program.

Other exemplary information that may be presented includes a sender and/or subject of e-mail messages. For example, the information may include the sender and/or subject a predetermined number of most recent e-mail messages. Further, exemplary information that may be presented includes a subject, time period, and/or location of a predetermined number of next appointments.

Figure 4:
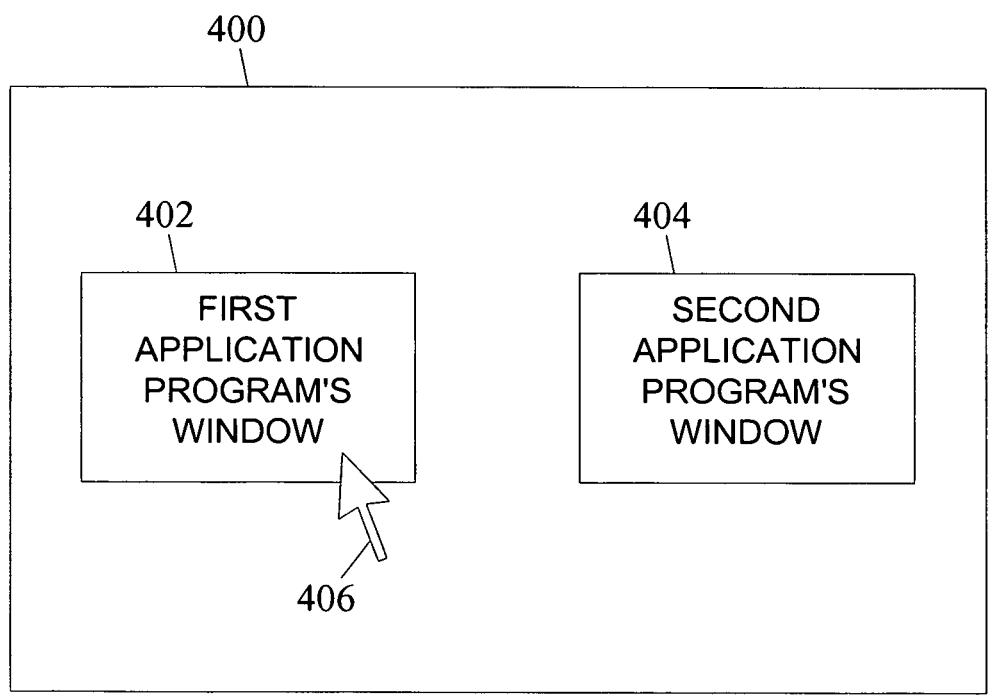
FIG. 4 is a screen display of windows associated with first and second application programs, respectively.

In block 302, input is received via input device 112. First and second application programs 102 and 104 may be responsive to inputs received via input device 112. In particular, first and second application programs 102 and 104 may be associated with respective user interface components with which input device 112. For example, FIG. 4 is a screen display 400 of windows 402 and 404 associated with first and second application programs 102 and 104, respectively. Screen display 400 may be displayed on display 110. Input device 112 may be a mouse configured to control a cursor 406 for interacting with windows 402 and 404. Windows 402 and 404 are user interface components associated with first and second application programs 102 and 104, respectively. Further, input may be received via input device 112 for neither interacting with user interface components associated with first and second application programs 102 and 104. The input may be received by windows manager 116. Further, windows manager 116 may send the input to MPM 118.

In block 304, AAPM 118 may determine whether first application program 102 is in focus within input device 112. For example, AAPM 118 may request information from windows manager 116 for indicating whether first application program 102 is in focus within input device 112. Windows manager 116 may maintain information indicating an application program that is in focus. For example, window 402 associated with first application program 102 may be in focus because window 402 has been clicked on by a mouse. Windows manager 116 may send an identifier to AAPM 118 for indicating an application program that is in focus within input device 112. If first application program 102 is not in focus, input is received via input device 112 in block 302 until first application program is in focus within input device 112.

When first application program 102 is in focus within input device 112, AAPM 118 may determine whether the received input is defined for interaction with first and second application programs in blocks 306 and 308, respectively. For example, MPM 118 may request information from windows manager 116 for indicating whether the received input is defined for interaction with windows 402 and 404 associated with first and second application programs 102 and 104, respectively. For example, an action of depressing a mouse button at a predetermined location of one of windows 402 and 404 may be a defined interaction. If the received user input is defined for interaction with either first application program 102 or second application program 104, input is received via input device 112 in block 302.

Referring to FIG. 3B, in block 310, AAPM 118 searches association database 120 for a record identifying the received input, first application program 102 as being in focus, and second application program 104. For example, records in a table such as Table 1 above may be searched for a matching record. AAPM 118 determines whether a matching record is found in association database 120. If a matching record is not found in association database 120 based on the search, input is received via input device 112 in block 302.

If a matching record is found in association database 120 based on the search, a portion of information related to second application program 104 is presented (block 314). AAPM 118 may request the information identified in a matching record from second application program 104. Second application program 104 may send the requested information to AAPM 118. Further, AAPM 118 may present the information in accordance with instructions identified in the matching record. For example, the information may be presented in a window on display 110. Further, the presentation of the information may be in accordance with a presentation characteristic identified in the matching record. In one example, the presentation of information related to second application program 104 may be managed by second application program 104. In another example, the presentation of information related to second application program 104 may be managed by a plug-in application associated with the content-type of second application program 104.

In block 316, AAPM 118 maintains the focus of first application program 102 within input device 112 while presenting the portion of information related to second application program 104. For example, one or more of the following may be contexts of window 402 may be maintained: a scroll context, a selection context, and a highlight context. Thus, in accordance with the subject matter described herein, input may be entered using a user interface for retrieving presenting information related to a second application program while focus is maintained in a first application program.

As described above, information from an application program may be presented to a user via a display. In one embodiment, a user may enter input for interacting with the displayed information. For example, a user may select an element in displayed information for accessing additional information associated with the element. For example, information from a calendar application program may be displayed. In this example, a user may select an element in the display to display additional information from the calendar application program.

In one embodiment, a user may enter a sequence of inputs into input device 112 for obtaining different summarization levels of information related to second application program 104. For example, a user can input a mouse gesture for receiving a first level of summarization for an e-mail application program. In this example, the user may input additional mouse gestures for receiving other levels of summarization for the e-mail application. In one example, a first e-mail application summarization level may include the sender of the two most recent e-mail messages. Information associated with subsequent summarization levels may include the sender and subject of the most two e-mail messages, the sender of the four most recent e-mail messages, and the sender and subject of the four most recent e-mail messages. In another example, information associated with different summarization levels of a calendar application program may include the following: subject and time period of the next appointment; subject, location, and time period of the next appointment; subject and time period of the next two appointments; and subject, location, and time period of the next appointment. The information associated with the summary levels may be displayed to a user sequentially as the input sequence is entered. The amount of information presented that relates to second application program 104 may increase for each input entered in the sequence.

In the examples described above, application programs 102 and 104 execute on a single processor 106. In an alternate embodiment, application programs may be run on separate processors. For example, application programs 102 and 104 may be run on separate processors. In another example of a networked television, a user may interact with, control, and view the status of other appliances. In this example, the other appliances may include application programs that independently run on a processor associated with the respective appliance. When application programs are independently running on separate processors, information may be requested on an application program running on a different processor. For example, a user may enter input for requesting information from an oven while the user watches a networked television. In another example, a user may enter input for requesting a summary of messages received on a computer while the user watches a networked television.

Input may trigger the display of information in windows for all application programs related to an application program with focus. For example, input may trigger presentation of information for all active application programs associated with an application program with focus. In one example, the information may be displayed on a portion of a display that surrounds a window of the application program with focus. In another embodiment, the information may be displayed in a stack of overlay windows such that each window is visible. In another example, the information may be displayed in a manner that relates the information to the respective application program originating the information. In one example, information related to a calendar application program may be displayed along the application program's taskbar. In another example, information related to a calendar application program may be displayed at a position of display where the application program was displayed at its last launch. In another example, the information may be displayed at a predetermined portion of display.

Presentation characteristics may be selected by a third party developer, a user, or a system default. In one example, presentation characteristics are based on a structure and/or length of the information for display. In another example, presentation characteristics may be selected based on an estimated amount of time required for reading text information for display. In another example, an eye tracking system may be used to track a user's eyes for determining when the eyes are moved away from a display. In this example, presented information is removed from the display when it is determined that the eyes are moved away from the display. In another example, the user may be presented with a user interface for closing a display window containing the information related to an application program. Presentation characteristics may be maintained in association database 120 and/or in a plug-in application.

Typically, application programs are packaged together in a suite. For example, a word processing application may be packaged with a web browser application. In one embodiment, application programs may be associated in accordance with the subject matter described herein by pre-association when the application programs are package together in a suite. Further, application programs may be associated by plug-in applications provided by third party application providers. In another example, associations may be generated automatically by a learning engine. In this example, the learning engine may determine user behavior or input in which a user changes focus between application programs and prompts the user to generate an association between the application programs. As a result, associations between application programs may change as user behavior changes. A user may modify or reject suggested associations.

Associations between application programs may be generated by a user. The user may define application programs having an association and define input for triggering retrieval of information from an application program not having focus. In one example, an association may be generated by a drag-and-drop operation between the presented information of a second application program to a window of a first application program having focus. In another example, a user may select two application programs for association, select information to be presented, and generate a new user interface input for the association. In this example, the user may update the association between the application programs by repeating steps taken for generating the association and then modifying the association.

In the examples described above, an application program is associated with only one other application program. In an alternative embodiment, a first application program may be associated with a plurality of application programs. The association between the first application program and the plurality of application programs may be used to present a portion of information related to the plurality of application programs when a predetermined input is received. The received input is not for interacting with user interface components associated with either the first application program or the plurality of application programs. For example, a user utilizing a word processing application program having focus may enter input relating to two other application programs. In this example, information may be presented that results from the association between the other two application programs. In another example, a user may enter input for requesting information from an e-mail application program and a calendar application program. In this example, the information may be retrieved from the application programs and presented simultaneously or in succession.

Information may be presented in any suitable combinations. In one example, information may be displayed in a window independent of a window of an application program having focus. In another example, information may be overlaid on window. Presentation characteristics, such as font size, font type, and font style, may be in any suitable combination. Further, the information may be displayed as being transparent and/or include transition characteristics, such as fade in and/or fade out.

Input may be defined for presenting information within a web browser. For example, the subject matter described herein may be implemented in a web browser for presenting information from web pages that are without focus. In particular, a user may enter input for requesting summary information of a non-selected tab. The characteristics associated with each level of summary may be specified. For example, at one level, the summary information presented via a user interface may include the top level headers and titles on a non-selected web page.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for interacting simultaneously with multiple application programs, the method comprising:
    creating a record of an association including data identifying a first application program, a second application program, information related to the second application program, and an input, wherein:
        the first application program is configured to present information related to the first application program and is responsive to inputs received via a user interface for interacting with user interface components associated with the first application program,
        the second application program is configured to present the information related to the second application program and is responsive to inputs received via the user interface for interacting with user interface components associated with the second application program, and
        the input is neither for interacting with the user interface components associated with the first application program nor the second application program;
    receiving the input via the user interface when the first application program has focus within the user interface, wherein the received input is neither for interacting with the user interface components associated with the first application program nor the second application program;

retrieving data from the record of the association; and
in response to receiving the input, presenting, while maintaining the focus of the first application program within the user interface, at least a portion of the information related to the second application program based on the data from the record of the association identifying the first and second application programs and the input.

2. The method of claim 1 wherein at least one of the first application program the second application program includes at least one of a calendar application program, an e-mail application program, an appliance application program, a web browser application program, and a word processing application program.

3. The method of claim 1 wherein receiving an input via the user interface includes receiving one of a predetermined mouse gesture, predetermined speech input, one or more predetermined keystrokes, and predetermined gaze input.

4. The method of claim 1 wherein presenting the at least a portion of information related to the second application program includes using the association between the first and second application programs to display a window including the portion of information.

5. The method of claim 4 wherein displaying a window includes displaying the window overlaying a portion of one of the first application program and the second application program.

6. The method of claim 1 wherein presenting the at least a the portion of information related to the second application program includes using the association between the first and second application programs to display the portion of information on a portion of a display surrounding a window associated with the first application program.

7. The method of claim 1 wherein presenting the at least a the portion of information related to the second application program includes using the association between the first and second application programs to display the portion of information in a stack of overlay windows.

8. The method of claim 1 wherein presenting the at least a portion of information related to the second application program includes using the association between the first and second application programs to display the portion of information in a taskbar associated with the second application program.

9. The method of claim 1 wherein presenting the at least a the portion of information related to the second application program includes using the association between the first and second application programs to display the portion of information in a position on a display of the second application program.

10. The method of claim 1 wherein presenting the at least a the portion of information related to the second application program includes using the association between the first and second application programs to display the portion of information in a predetermined position on a display.

11. The method of claim 1 wherein presenting the at least a portion of information related to the second application program includes presenting the portion of information with predetermined presentation characteristics.

12. The method of claim 1 wherein maintaining the focus of the first application program within the user interface includes maintaining a context of a user interaction with the first application program.

13. The method of claim 12 wherein maintaining a context of a user interaction with the first application program includes maintaining one of a scroll context with the first application program, a selection context with the first application program, and a highlight context with the first application program.

14. The method of claim 1 comprising:
allowing the first application program to be associated with a plurality of application programs, wherein the plurality of application programs is responsive to inputs received via the user interface for interacting with respective user interface components associated with the plurality of application programs;
wherein the received input is not for interacting with the user interface components associated with the plurality of application programs;
creating a record of the association including data identifying the application programs and the input;
retrieving data from the record of the association between the first application program and the plurality of application programs; and
presenting a portion of information related to the plurality of application programs while maintaining focus of the first application program within the user interface based on the data from the record.

15. The method of claim 1 comprising:
(a) receiving a plurality of inputs in sequence via the user interface when the first application program has focus with the user interface, wherein the received inputs are neither for interacting with the user interface components associated with the first application program nor the second application program; and
(b) in response to receiving the inputs, using the association between the first and second application programs to present an increasing amount of information related to the second application program based on the received sequence of inputs.

16. The method of claim 1 comprising:
(a) determining user input with respect to the first and second application programs; and
(b) creating an association including the first and second application programs based on the determined user input.

17. A system for interacting simultaneously with multiple application programs, the system comprising system components including:
an associated application program manager component configured to create a record of an association including data identifying a first application program, a second application program, information related to the second application program, and an input, wherein:
the first application program is configured to present information related to the first application program and is responsive to inputs received via a user interface for interacting with user interface components associated with the first application program,
the second application program is configured to present the information related to the second application program and is responsive to inputs received via the user interface for interacting with user interface components associated with the second application program, and
the input is neither for interacting with the user interface components associated with the first application program nor the second application program;
a user interface component configured to receive the input when the first application program has focus within the user interface, wherein the received input is neither for interacting with the user interface components associated with the first application program nor the second application program; and the associated application program manager is further configured to retrieve data from the record of the association and use the data from the record of the association identifying of the first and second application programs, the input, and the information related to the second application program to present at least a portion of the information related to the second application program while maintaining the focus of the first application program within the user interface in response to the received input, wherein at least one of the system components includes at least one electronic hardware component.

18. The system of claim 17 wherein the user interface is configured to receive one of a predetermined mouse gesture, predetermined speech input, one or more predetermined keystrokes, and predetermined gaze input.

19. The system of claim 17 wherein the associated application program manager is configured to allow one of a calendar application program, an e-mail application program, an appliance application program, a web browser application program, and a word processing application program to be associated with one of another of a calendar application program, an e-mail application program, an appliance application program, a web browser application program, and a word processing application program.

20. The system of claim 17 wherein the associated application program manager is configured to use the data from the record of the association identifying the first and second application programs to display a window including the portion of information.

21. The system of claim 20 wherein the associated application program manager is configured to display the window overlaying a portion of one of the first application program and the second application program.

22. The system of claim 17 wherein the associated application program manager is configured to use the data from the record of the association identifying the first and second application programs to display the portion of information on a portion of a display surrounding a window associated with the first application program.

23. The system of claim 17 wherein the associated application program manager is configured to use the data from the record of the association identifying the first and second application programs to display the portion of information in a stack of overlay windows.

24. The system of claim 17 wherein the associated application program manager is configured to use the data from the record of the association identifying the first and second application programs to display the portion of information in a taskbar associated with the second application program.

25. The system of claim 17 wherein the associated application program manager is configured to use the data from the record of the association identifying the first and second application programs to display the portion of information in a position on a display of the second application program.

26. The system of claim 17 wherein the associated application program manager is configured to use the data from the record of the association identifying the first and second application programs to display the portion of information in a predetermined position on a display.

27. The system of claim 17 wherein the associated application program manager is configured to present the portion of information with predetermined presentation characteristics.

28. The system of claim 17 wherein the associated application program manager is configured to present the portion of information related to the second application program based on the received input.

29. The system of claim 17 wherein the associated application program manager is configured to maintain a context of a user interaction with the first application program.

30. The system of claim 29 wherein the associated application program manager is configured to maintain one of a scroll context with the first application program, a selection context with the first application program, and a highlight context with the first application program.

31. The system of claim 17:
wherein the user interface is configured to receive input that is not for interacting with the user interface components associated with a plurality of application programs; and wherein the associated application program manager is configured to allow the first application program to be associated with the plurality of application programs, wherein the plurality of application programs are response to inputs received via the user interface for interacting with respective user interface components associated with the plurality of application programs, and wherein the associated application program manager is configured to present a portion of information related to the plurality of application programs while maintaining focus of the first application program within the user interface.

32. The system of claim 17 wherein the use interface is configured to receive a plurality of inputs in sequence via the user interface when the first application program has focus with the user interface, wherein the received inputs are neither for interacting with the user interface components associated with the first application program nor the second application program, and wherein the associated application program manager is configured to use the data from the record of the association identifying the first and second application programs to present an increasing amount of information related to the second application program based on the received sequence of inputs in response to receiving the inputs.

33. The system of claim 17 wherein the association application program manger is configured to determine user input with respect to the first and second application programs, and configured to associate the first and second application programs based on the determined user input.

34. A system for interacting simultaneously with multiple application programs, the system comprising:
means for creating a record of an association including data identifying a first application program, a second application program, information related to the second application program, and an input, wherein:

the first application program is configured to present information related to the first application program and is responsive to inputs received via a user interface for interacting with user interface components associated with the first application program, the second application program is configured to present the information related to the second application program and is responsive to inputs received via the user interface for interacting with user interface components associated with the second application program, and the input is neither for interacting with the user interface components associated with the first application program nor the second application program;

means for receiving the input via the user interface when the first application program has focus within the user interface, wherein the received input is neither for interacting with the user interface components associated with the first application program nor the second application program; and means for retrieve data from the record of the association and using the data from the record of the association identifying of the first and second application programs, the input, and the information related to the second application program to present at least a portion of the information related to the second application program while maintaining the focus of the first application program within the user interface in response to receiving the input, wherein at least one of the means includes at least one electronic hardware component.

35. A computer program product comprising computer executable instructions embodied in a computer readable medium for performing steps comprising:

creating a record of an association including data identifying associating a first application program, a second application program, information related to the second application program, and an input, wherein:

the first application program is configured to present information related to the first application program and is responsive to inputs received via a user interface for interacting with user interface components associated with the first application program, the second application program is configured to present the information related to the second application program and is responsive to inputs received via the user interface for interacting with user interface components associated with the second application program, and the input is neither for interacting with the user interface components associated with the first application program nor the second application program;

receiving the input via the user interface when the first application program has focus within the user interface, wherein the received input is neither for interacting with the user interface components associated with the first application program nor the second application program;

retrieving data from the record of the association; and in response to receiving the input, presenting, while maintaining the focus of the first application program within the user interface, at least a portion of the information related to the second application program based on the data from the record of the association identifying the first and second application programs and the input.

* * * * *